United States Patent
Jaworski et al.

[11] Patent Number: 6,069,461
[45] Date of Patent: *May 30, 2000

[54] DIGITAL OR RESISTORLESS INTERVAL WIPER SWITCH AND SYSTEM

[75] Inventors: David Joseph Jaworski, Bloomfield; Mark Christian Aaron, Canton; Michael J. Buchanan, Rochester Hills; Kenneth George Slotkowski, West Bloomfield, all of Mich.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/192,483

[22] Filed: Nov. 16, 1998

[51] Int. Cl.[7] .................................................. H02P 1/04
[52] U.S. Cl. ...................... 318/443; 318/444; 318/DIG. 2
[58] Field of Search ..................... 318/443, 444, 318/DIG. 2; 15/250.001, 250.12, 250.17

[56] References Cited

U.S. PATENT DOCUMENTS

| | | |
|---|---|---|
| 2,965,913 | 12/1960 | Ziegler . |
| 3,573,584 | 4/1971 | Kearns ...................................... 318/331 |
| 3,869,654 | 3/1975 | Bischoff et al. .......................... 318/443 |
| 4,314,186 | 2/1982 | Gille et al. ................................ 318/435 |
| 4,317,073 | 2/1982 | Blaszkowski ............................ 318/483 |
| 4,336,482 | 6/1982 | Goertler et al. .......................... 318/443 |
| 4,339,698 | 7/1982 | Kearns ...................................... 318/444 |
| 4,492,904 | 1/1985 | Graham .................................... 318/444 |
| 4,585,980 | 4/1986 | Gille et al. ................................ 318/444 |
| 4,607,198 | 8/1986 | Tsunoda ................................... 318/443 |
| 4,614,903 | 9/1986 | Betsc et al. .............................. 318/443 |
| 4,620,141 | 10/1986 | McCumber et al. ..................... 318/483 |
| 4,663,575 | 5/1987 | Juzswik et al. .......................... 318/444 |
| 4,670,695 | 6/1987 | Licata et al. ............................. 318/443 |
| 4,710,878 | 12/1987 | Iyoda ....................................... 364/424 |
| 4,857,815 | 8/1989 | Erdelitsch et al. ....................... 318/443 |
| 4,947,092 | 8/1990 | Nabha et al. ............................ 318/444 |
| 5,239,244 | 8/1993 | Teder ....................................... 318/444 |
| 5,493,190 | 2/1996 | Mueller ................................... 318/443 |

*Primary Examiner*—Stanley J. Witkowski
*Assistant Examiner*—Rita Leykin
*Attorney, Agent, or Firm*—Mark S. Sparschu

[57] ABSTRACT

The use of a Gray code ganged wiper switch and an electronic circuit controlling the washer-pump motor and wiper motor allow the use of a minimal number of wires in the overall interval wiper system than found in conventional systems. Circuit redundancy and Gray coding method provides several added reliability features at a low manufacturing cost. The system further provides a resistorless control of the several power output functions of the system.

11 Claims, 2 Drawing Sheets

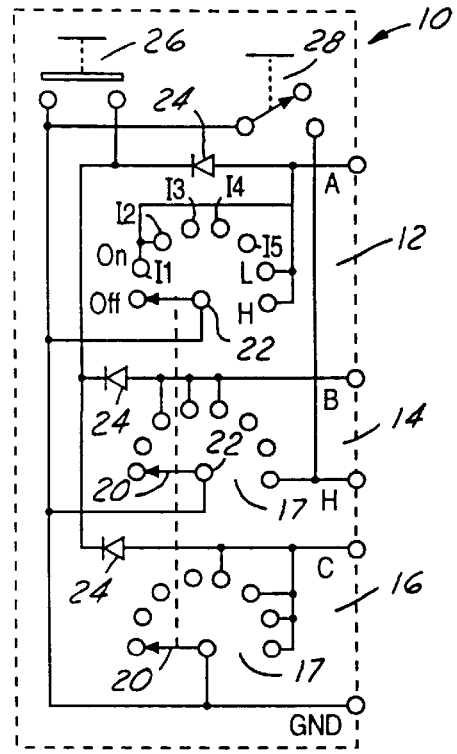
FIG. 1
| MODE | H | C | B | A |
|---|---|---|---|---|
| OFF | 1 | 1 | 1 | 1 |
| INT 1 | 1 | 1 | 1 | 0 |
| INT 2 | 1 | 1 | 0 | 0 |
| INT 3 | 1 | 1 | 0 | 1 |
| INT 4 | 1 | 0 | 0 | 1 |
| INT 5 | 1 | 0 | 1 | 1 |
| LOW | 1 | 0 | 1 | 0 |
| HIGH | 0 | 0 | 1 | 0 |
| WASH | 1 | 0 | 0 | 0 |
| MIST | 0 | S | S | S |
S = PRIOR STATE
FIG. 2
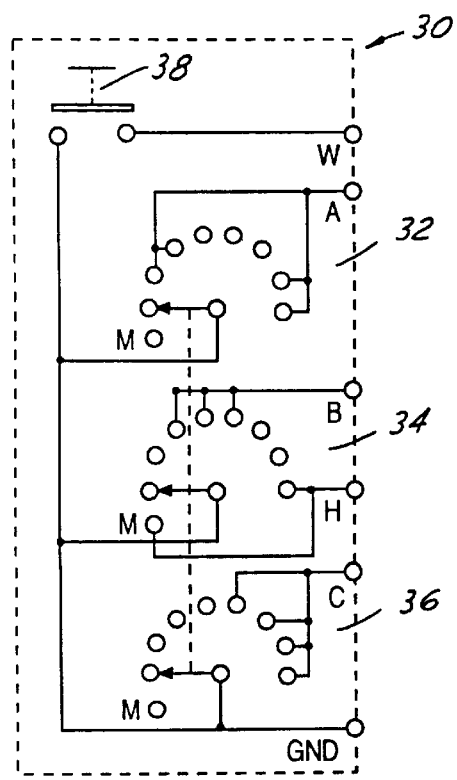
FIG. 3
| MODE | W | H | C | B | A |
|---|---|---|---|---|---|
| OFF | 1 | 1 | 1 | 1 | 1 |
| INT 1 | 1 | 1 | 1 | 1 | 0 |
| INT 2 | 1 | 1 | 1 | 0 | 0 |
| INT 3 | 1 | 1 | 1 | 0 | 1 |
| INT 4 | 1 | 1 | 0 | 0 | 1 |
| INT 5 | 1 | 1 | 0 | 1 | 1 |
| LOW | 1 | 1 | 0 | 1 | 0 |
| HIGH | 1 | 0 | 0 | 1 | 0 |
| WASH | 0 | S | S | S | S |
| MIST | S | 0 | 1 | 1 | 1 |
S = PRIOR STATE
FIG. 4

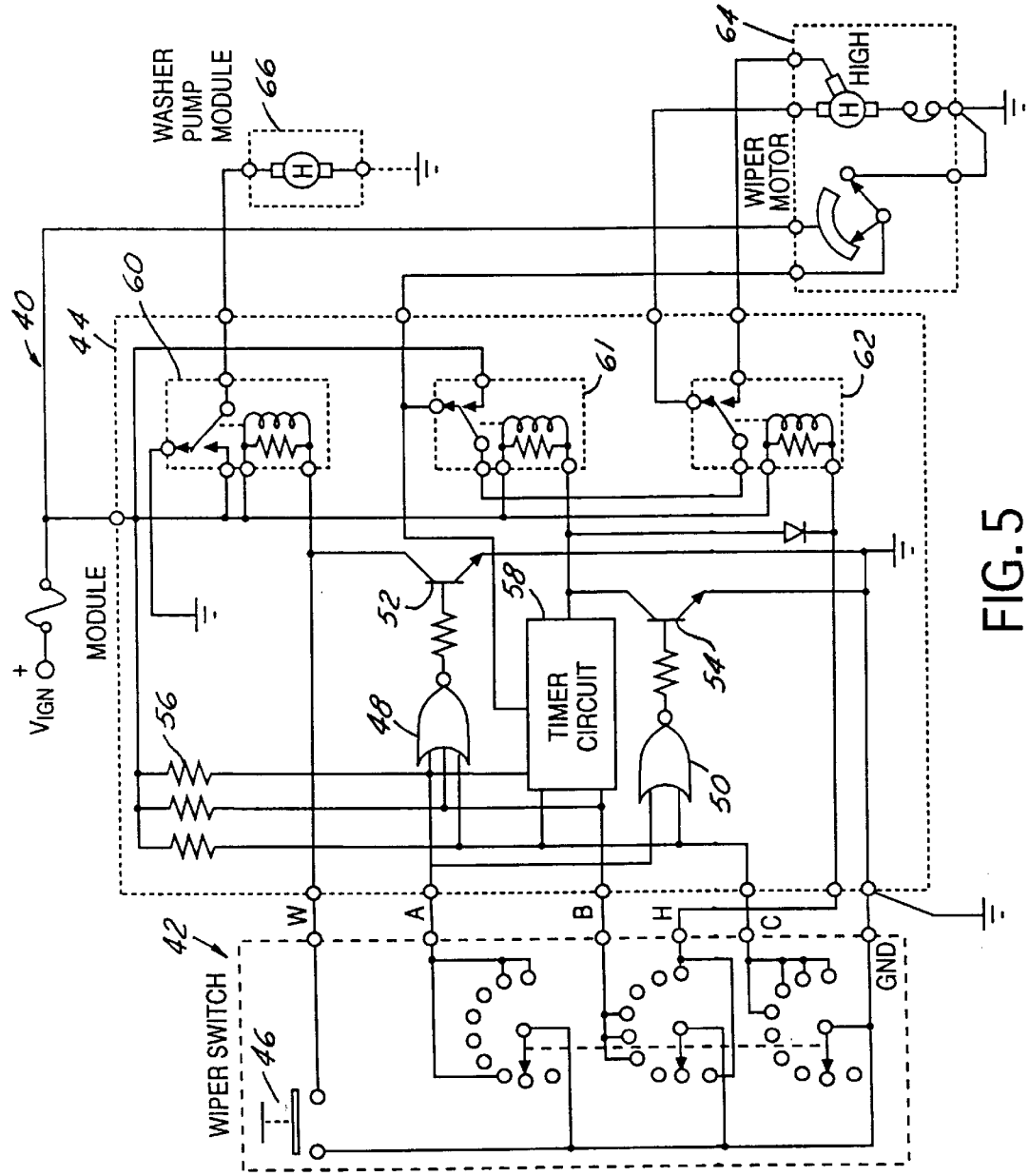

DIGITAL OR RESISTORLESS INTERVAL WIPER SWITCH AND SYSTEM

FIELD OF INVENTION

This invention, in general, relates to windshield wiper blade control and more particularly to electronic timing control of windshield wiper motors.

BACKGROUND INFORMATION

Prior Art

U.S. Pat. No. 5,493,190 issued to Mueller on Feb. 20, 1996 and entitled Windshield Wiper Auto-Delay Control Interface, teaches the use of resistors to control the voltage applied to a node in a windshield wiper control for an auto-delay interface.

U.S. Pat. No. 5,239,244 issued to Teder on Aug. 24, 1993 and entitled Vehicle Interface for Moisture-Sensitive Wiper Control teaches a means to facilitate integrating a moisture-sensitive wiper control system into an existing design of wiper system with minimum impact on manufacture and retrofit.

U.S. Pat. No. 4,947,092 entitled Solid State Windshield Wash and Wipe Controller issued to Nabha et al. on Aug. 7, 1990, teaches short circuit protection for the solid state motor driving and braking control for a plurality of modes of operation of the windshield wipers.

U.S. Pat. No. 4,857,815 entitled Switch for Energizing an Electric Motor of a Wiper System issued on Aug. 15, 1989 to Erdelitsch et al. teaches a wiper switch design for energizing an electric motor of a wiper system. In addition it teaches the use of bridging contacts in the switch.

U.S. Pat. No. 4,620,141 issued to McCumber et al. on October 1986, teaches an electronic control circuit for a windshield wiper motor that includes a windshield mounted sensor module utilizing a plurality of radiant energy sources. These sources are pulsed on and off in accordance with a pre-established duty cycle, in conjunction with a further plurality of radiant energy sensors which are oriented relative to light transmitting channels such that they intersect at the outside surface of the windshield.

U.S. Pat. No. 4,339,698 issued to Kearns on Jul. 13, 1982 and entitled Control Apparatus for Windshield Wiper System, teaches an apparatus for controlling the operation of a windshield wiper motor using resistors connected from the switch. The switches are single pole double throw switches.

U.S. Pat. No. 4,317,073 issued on Feb. 23, 1982 to Blaszkowski and entitled Windshield Wiper Control System, teaches a moisture sensing windshield wiper circuit. Resistors are liberally used in the timing circuits.

U.S. Pat. No. 3,869,654 entitled Windshield Wiper Control Circuit and issued on Mar. 4, 1975 to Bischoff et al., teaches windshield wiper control for a pulse and intermittent run system using resistors in the operator control wiper switch.

Presently, an interval wiper subsystem has a wiper switch that is currently part of the multifunction switch, a control module and a wiper motor. The wiper switch is used by the operator to control the speed of the wiper motor and the dispensing of washer fluid for the windshield or liftgate. The use of the wiper switch allows the operator to select the mode of the wiper motor, OFF, INT1, INT2, INT3, LOW and HIGH. The wiper switch also allows the operator to dispense washer solvent onto the windshield or liftgate with the amount controlled by the length of the time the washer button is actuated or depressed.

The wiper switch modes that control the wiper subsystem use many different principles. A traditional method uses direct control of the 'LOW' and 'HIGH' speeds of the wiper motor requiring high current contacts in the wiper switch and a variable resistor for the interval mode which provides control to the wiper motor via a control module. Subsystems using this approach require five to ten wires from the wiper switch.

A variation on this method utilizes relays to control the 'HIGH' and/or 'LOW' speeds of the wiper motor, lowering the wiper switch current and potentially reducing the number of wires from the wiper switch.

Another method uses a resistor ladder with as few as three wires and however, must use electronics to decode the voltage levels from the wiper switch to provide control to the wiper motor. However, this method is susceptible to leakage current, switch corrosion and manufacturing issues impairing performance.

SUMMARY OF THE INVENTION

It is a principal advantage of the present invention to provide an interval wiper system for controlling the wiper motor and the washer pump without the use of resistors for electric current control.

It is yet another advantage of the present invention to reduce the manufacturing costs and complexity of the wiper switch by reducing the number of wires to the switch.

It is yet another advantage to provide a wiper switch that provides selection of various wiper functions as a result of the use of a Gray code switching mechanism wherein the change from each switch position results in only one non-redundant operation.

It is still another advantage to multipurpose wiper switch that lends itself to be packaged in the drive control lever operatively connected to the steering column in a motor vehicle for ease of use by the vehicle operator.

These and other advantages are found in a digital resistorless interval windshield wiper system having a ganged rotary switch having three switch decks with at least eight positions on each of the decks. The ganged rotary switch has switch wipers synchronously rotatable on each of the decks addressing the identical position on each of the decks. At least one output terminal one each deck and one of said decks having at least two output terminals for creating a four bit Gray code from the output terminals.

An electronic control circuit has at least four inputs; each input for receiving one of the four bit Gray code output terminals. The electronic control circuit has a logic circuit, and a timing circuit responsive to one or more inputs and operable for generating a plurality of pulsed signals having a predetermined time period. A plurality of relays is operationally responsive to the outputs of the logic circuit and the timing circuit for actuation. A wiper motor is electrically connected to one or more of the relays for reciprocally moving one or more windshield wipers across said windshield.

DETAILED DESCRIPTION OF THE DRAWINGS

In the drawings:

FIG. 1 is a schematic of a basic Gray code ganged wiper switch according to one embodiment;

FIG. 2 is a truth table for FIG. 1;

FIG. 3 is a schematic of another Gray code ganged wiper switch according to another embodiment;

FIG. 4 is a truth table for FIG. 3;

FIG. 5 is a schematic of a Gray code interval wiper system according to a preferred embodiment; and FIG. 6 is a truth table for FIG. 5.

DETAILED DESCRIPTION OF A PREFERRED EMBODIMENT

Referring to the drawings by reference figures, a Gray code ganged, or linear, switch 10 of the preferred embodiment is illustrated. The switch has a plurality of switch decks or sections 12, 14, 16, with each deck having eight positions Off, INT1 or I1, INT2 or I2, INT3 or I3, INT4 or I4, INT5 or I5, LOW or L, and HIGH or H. Each position is equally and angularly spaced about the axis position 18 of the ganged switch 10.

The use of Gray code in the ganged switch provides the opportunity for each switch wiper position to generate a coded output which obeys the rules of Gray code in that only one output changes with each switch wiper 20 rotating from one position to the next. This is shown in the several truth tables in FIGS. 2, 4, and 6. In the embodiment of FIG. 1, this is a four bit Gray code that is modified by the addition of one or more additional switches as will described hereinafter.

Illustrated on each deck 12, 14, 16 is a switch wiper 20. The switch wipers 20 on each deck are synchronous and reciprocally rotated across each of said positions 17 from a home position, OFF, that is the position of the switch wipers 20 in FIG. 1. Each switch wiper is connected to a common node 22 identified in FIG. 1 as GND, Ground. As will be shown, this identifies the typical electrical connection that is electrical ground.

In the preferred embodiment as will be explained later, the switch of FIG. 1 may be used in a windshield wiper system of a motor vehicle and it is convenient to identify each switch position according to its function in the wiper system. Thus, reading clockwise on each switch deck from the home position, the positions are identified as OFF, INT1, INT2, INT3, INT 4, INT 5, LOW, and HIGH. INT is an abbreviation for the function of INTERVAL, and each INT position will, as hereinafter be explained with cause a different interval of operation in a powered up system.

The various switch positions 17 on each deck 12, 14, 16 are connected to an output terminal, A, B, C, or H, on each deck. As an example on the bottom deck 16 as illustrated in FIG. 1, the outputs from positions INT4 through HIGH are connected to output terminal C. In a similar manner, each deck 12, 14, 16 has a unique pattern of positions connected to output terminals A, B and H. The configuration of the positions on each deck is a function of the design of the switch 10.

A diode 24 on each deck 12, 14, 16 allows the extra switch 26, the output of that switch to OR'D to each output. In the embodiment of the system, this switch 26 is the wash switch and operates to activate the windshield washer pump at all positions. The Mist switch 28 is connected to the HIGH position. It causes the wiper motor to operate at its highest rotational speed.

Referring to FIG. 2, there is defined by means of a truth table, the Gray code of the switch of FIG. 1. A study of the binary values, 0 and 1, in the table will show that as the switch wipers 20 rotate one position, only one binary value will change. This is the definition of the Gray code and is well known.

The change in the switch 30 illustrated in FIG. 3 not only removes a separate mist switch but also locates a ninth position M counterclockwise from the normal home position on each deck 32, 34, 36. This new position adds the MIST position prior to the HOME position. The H output terminal is additionally connected to the MIST position on the second or middle deck 34 to drive the output for a time period equal to the time the position of the interval switch 38 is activated by vehicle operator. As is well known, the vehicle operator rotates the wiper switch in a counterclockwise position from the OFF position to activate the MIST washer function. This is an operational function controlled by the system specifications.

The truth table of FIG. 4 will identify the Gray code outputs from this switch 30 embodiment.

Referring to FIG. 5, there is illustrated an interval windshield wiper system 40 according to a preferred embodiment. The ganged switch 42 in this Figure is identical to the switch of FIG. 3. An electronic control circuit 44 has at least four inputs that are electrically connected to the outputs, A, B, C, and H, of the switch 42. The outputs W and GND of the switch are not Gray code outputs but are unique outputs for the special functions of the system 40. The W output is connected to the momentary switch 46 that is defined as the wash switch and as shown will cause the windshield wash function as specified by the system specifications.

The electronic control circuit 44 contains a logic means that is formed by the NOR gates 48, 50 and the pair of output transistors 52, 54 and associated three voltage dropping resistors 56. In addition, the electronic control circuit contains a timing circuit 58 that is responsive to one or more inputs; in particular A, B and C to generate a plurality of signals each having a predetermined time period. The purpose of the timing circuit 58 is to define the different interval modes in terms of predetermined time periods.

Additionally there is shown a plurality of relays 60, 61, 62 operationally connected to the logic means for controlling the wiper motor 64 and washer-pump motor 66. In particular, the conventional windshield wiper motor 64 is electrically connected to at least two relays 61, 62. The operation of the wiper motor and the washer-pump motor is well-known and is not the subject of this invention.

In FIG. 5 the wash function of the system is controlled from the W output from the switch 42. If the switch of FIG. 1 is used, then the NOR gate formed by the three diodes operates to use output terminals A, B, and C. In either case, the wash function of the system requires the wiper motor 64 to wipe with a fixed number of after-wipes when the wiper switch 46 is off; the logic states of either switch accommodate this feature. In a similar manner, when the wiper switch is in an interval mode and the operator requires the wash function, the system will activate the wash motor and the wiper motor with a fixed number of wipes and then revert back to the interval mode.

The electronic control circuit 44 provides a system redundancy to enhance the wiper system reliability. The circuit provides a low-speed wipe control by a two input NOR gate 50 connected to the A and C terminals of the wiper switch 42. The output of the NOR gate is connected to a driver transistor 54 in parallel with the timer circuit 58 to provide the desired redundancy. Another redundancy enhancing system reliability is accomplished by actuating the high speed wipe mode at the wiper switch to activate both the interval/low speed relay and the high speed relay 61, 62 without the use of the logic circuit outputs to activate the wiper motor. If the H input circuit should become severed when the wiper switch is in the high-speed mode, the high-speed operation is then lost but the wipers will revert to the low speed operation. This is yet another safety feature of the system reliability.

There has thus been described an interval wiper system without the use of power dropping and dissipating resistors. In addition, the manufacturing costs of the system are reduced by requiring wiring connecting only the relay outputs to the several wiper-motor and washer-pump motors 64, 66. However, the number of circuits required to implement the Gray code logic is more than a resistor ladder switch. Reliability is enhanced by the digital Gray code native of the switch output and by discretionary use of redundancy.

Additional features of the digital system are the use of the Gray code. Redundancy allows high speed to revert to low speed if there is a high speed line failure. Additional redundancy allows the high speed to bypass the electronics in the event of failure of the electronics. As the need arises, the system can be upgraded to adding moisture control by redesigning the "int" code as "auto" code and adding the appropriate control.

What is claimed is:

1. A digital resistorless interval wiper switch adaptable for controlling windshield wipers of a motor vehicle, comprising;
    a ganged switch having a plurality of switch decks, each deck having a plurality of positions equally and angularly spaced from an axis position;
    a switch wiper on each of said ganged decks for angular reciprocal synchronous movement across said positions, each switch wiper electrically connected to a common node; and
    at least one output on each deck respectively connected to one or more positions;
    whereby as said switch wipers are rotated across said decks, the outputs from said ganged switch are adaptable to form a Gray code output equal to the number of positions on said decks.

2. A digital resistorless interval wiper switch according to claim 1 additionally including a momentary push button switch electrically connected to one of said outputs overriding one of said Gray code outputs adaptable for generating an additional unique output.

3. A digital resistorless interval wiper switch according to claim 1 additionally including switch means electrically connected in circuit for providing a unique output from said ganged switch outputs that renders all other outputs invalid.

4. A digital resistorless interval wiper switch according to claim 1 wherein the number of positions on each deck is eight in number and the number of Gray code outputs equals the number of positions on each deck.

5. A digital resistorless interval wiper switch according to claim 4 additionally including a push button switch electrically connected to one of said outputs for providing an additional output exceeding the number of positions on said decks as long as said push button switch is actuated.

6. A digital resistorless interval wiper switch according to claim 4 additionally including switch means electrically connected in circuit for providing an additional output code exceeding the number of positions on said decks, said output operates to render all other outputs invalid as long as said switch means is actuated.

7. A digital resistorless interval wiper switch according to claim 1 additionally including:
    an electronic control circuit electrically having a plurality of inputs connected to said outputs, said electronic control circuit having a decoder means responsive to said Gray code outputs from for decoding said outputs;
    timer circuit means in said electronic control circuit for generating pulse timing signals in response to said Gray code outputs; and
    a plurality of relays electrically connected to said electronic control circuit and actuable in response to said Gray code outputs.

8. A digital resistorless interval windshield wiper system comprising:
    a ganged rotary switch having three switch decks with at least eight positions on each of said decks, said switch having
        switch wipers synchronously rotatable on said decks addressing the identical position on each of said decks, and
        at least one output terminal for generating and one of said decks having at least two output terminals for creating a four bit Gray code from said output terminals;
    an electronic control circuit having at least four inputs, each input for receiving one of said four bit Gray code output terminals from said ganged switch, said electronic control circuit having
        logic means, and
        a timing circuit responsive to one or more inputs and operable for generating a plurality of pulsed signals, each signal having a predetermined time period;
    a plurality of relays operationally responsive to said logic means and said timing circuit for actuation; and
    a wiper motor electrically connected to one or more of said relays for reciprocally moving one or more windshield wipers across said windshield.

9. A digital resistorless interval windshield wiper system according to claim 8 additionally including a single pole switch electrically connected to generate a single unique code for actuating a relay for actuating a washer pump motor for a predetermined time period.

10. A digital resistorless interval windshield wiper system according to claim 8 additionally including redundant means comprising a logic circuit in parallel with the timer circuit to initiate a low speed wiper motor control signal during a failure of the timer circuit whereby the wiper operation is not discontinued.

11. A digital resistorless interval windshield wiper system according to claim 8 additionally including logic circuit means bypassing the high speed control system during a fault and causing the low speed control system to activate for preventing loss of wiper motor operation.

* * * * *

UNITED STATES PATENT AND TRADEMARK OFFICE
CERTIFICATE OF CORRECTION

PATENT NO. : 6,069,461
DATED : May 30, 2000
INVENTOR(S) : David J. Jaworski, et al.

It is certified that error appears in the above-identified patent and that said Letters Patent is hereby corrected as shown below:

On the title page, item [75] Inventors, Add:

```
Peter Langer, Rochester Hills, MI
Dean Jarski, Bloomfield, MI
Mircea D. Munteanu, Northville, Mi
```

Signed and Sealed this

Twenty-second Day of May, 2001

*Attest:*

NICHOLAS P. GODICI

*Attesting Officer*  *Acting Director of the United States Patent and Trademark Office*